United States Patent [19]
Goto

[11] Patent Number: 5,708,766
[45] Date of Patent: Jan. 13, 1998

[54] FILING DEVICE

[75] Inventor: Atsushi Goto, Machida, Japan

[73] Assignee: Ricoh Company, Ltd., Tokyo, Japan

[21] Appl. No.: 364,748

[22] Filed: Dec. 27, 1994

[30] Foreign Application Priority Data

Dec. 27, 1993 [JP] Japan ................................. 5-350548

[51] Int. Cl.$^6$ ................................................. G06F 15/00
[52] U.S. Cl. ........................................................ 395/133
[58] Field of Search ..................... 364/419.19; 395/773; 345/115, 116

[56] References Cited

U.S. PATENT DOCUMENTS 5,432,897 7/1995 Tatsumi et al. .......................... 395/140
5,481,664 1/1996 Hiroya et al. ........................... 395/154

Primary Examiner—Phu K. Nguyen
Attorney, Agent, or Firm—Oblon, Spivak, McClelland, Maier & Neustadt, P.C.

[57] ABSTRACT

A filing device for storing a plurality of documents in a storage device in the form of images and allowing any of them to be searched for when needed. A memo data generating section generates memo data related to a particular image document and containing information on the person who entered the memo. A memo image is overlaid on the original document image on the basis of the memo data. The resulting composite image is output. A searching section searches, based on the data generated by the memo data generating section, document images by use of the content of the memo as a key. Marking data generating section generates marking data related to a particular image document and containing information on the person who entered the marking. A marked document image is, output on the basis of the data. The searching section searches, based on the data generated by the marking data generating section, documents by using the content of the marked area as a key.

20 Claims, 10 Drawing Sheets

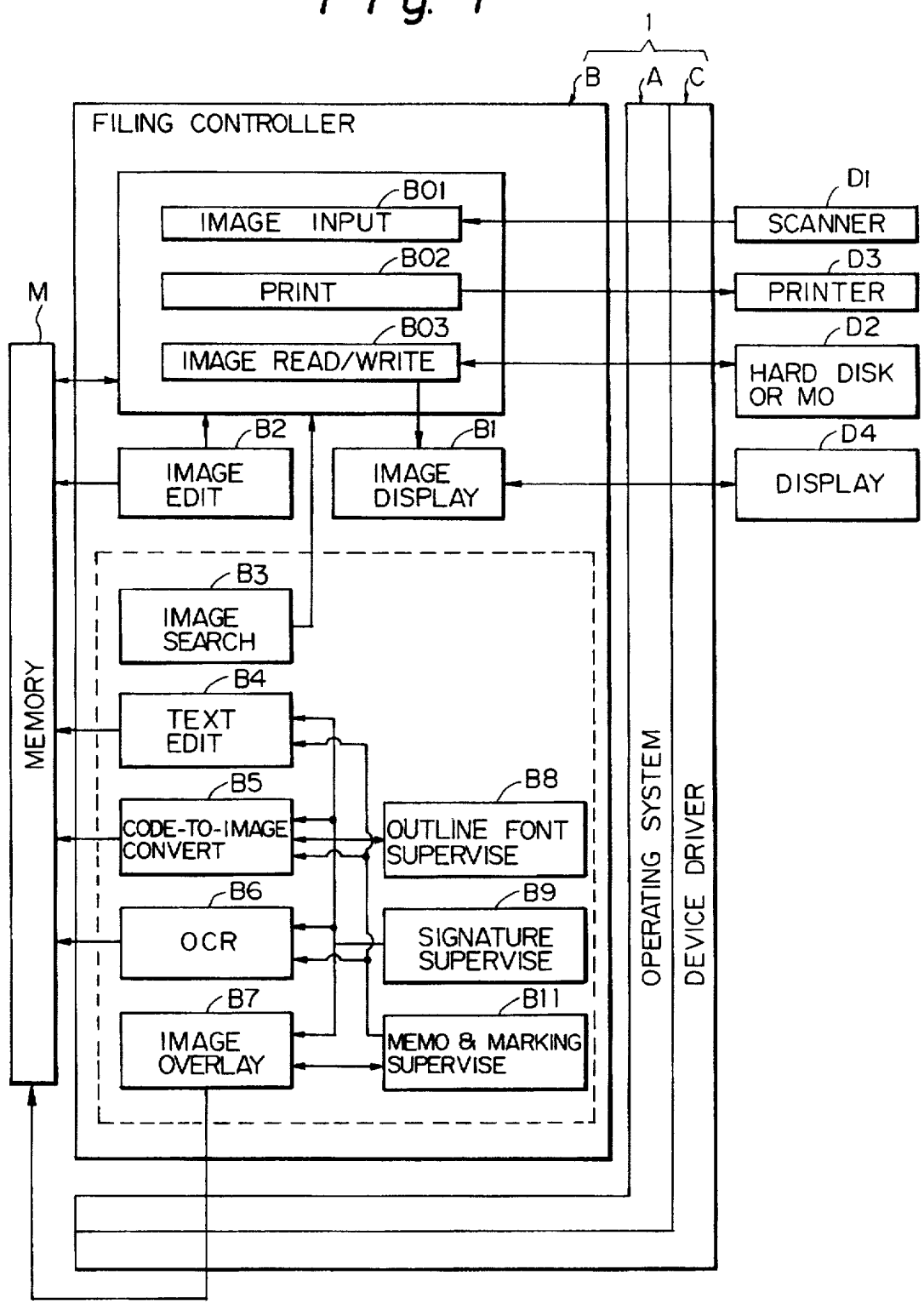

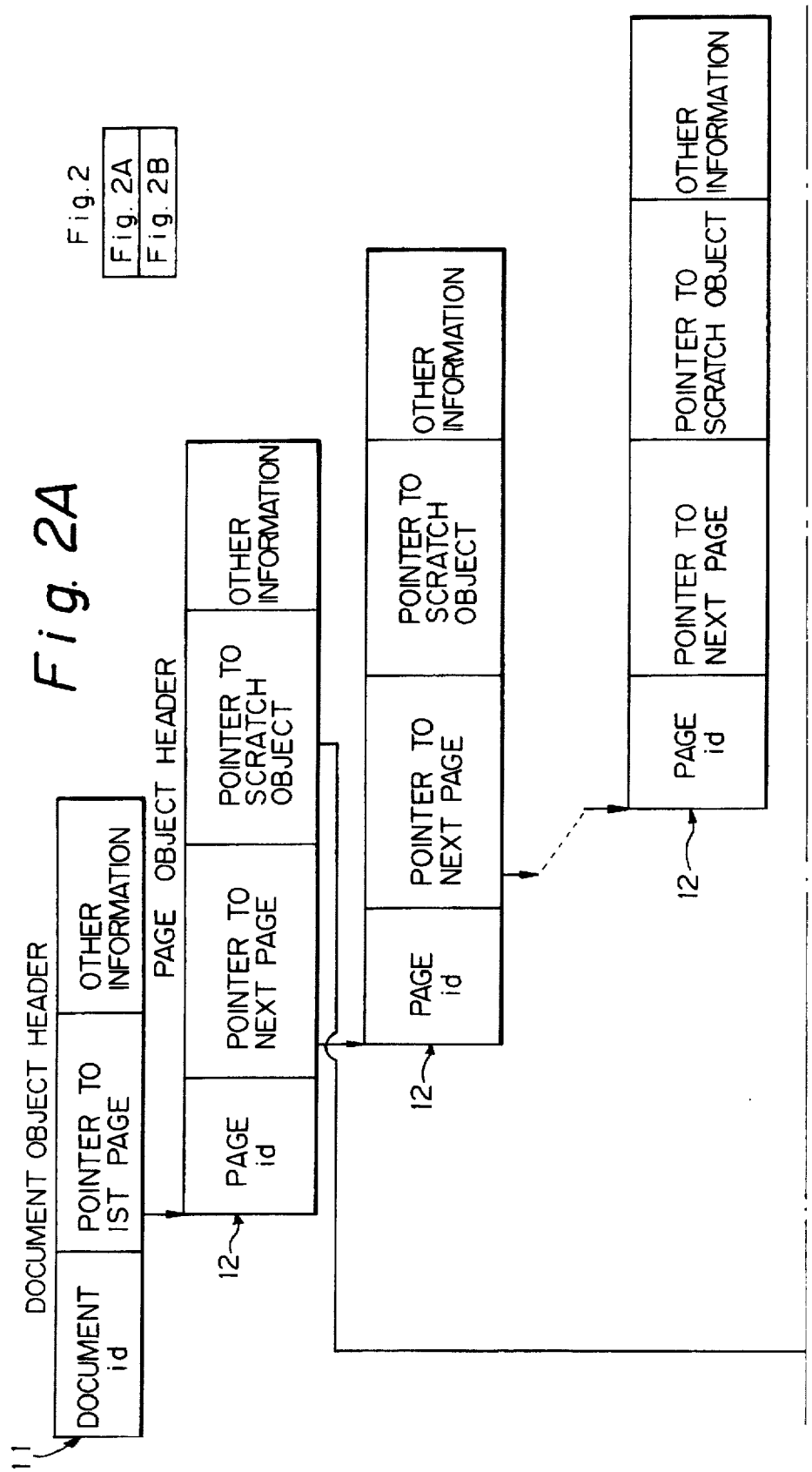

Fig. 4
| Fig. 4A |
|---|
| Fig. 4B |
Fig. 4A
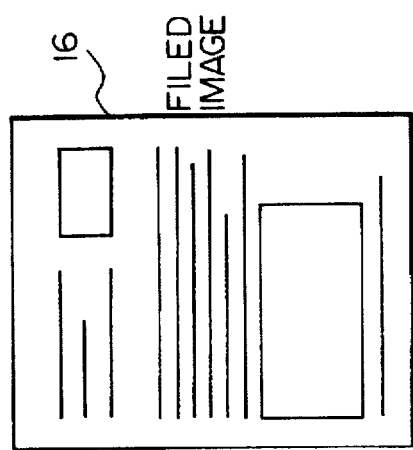
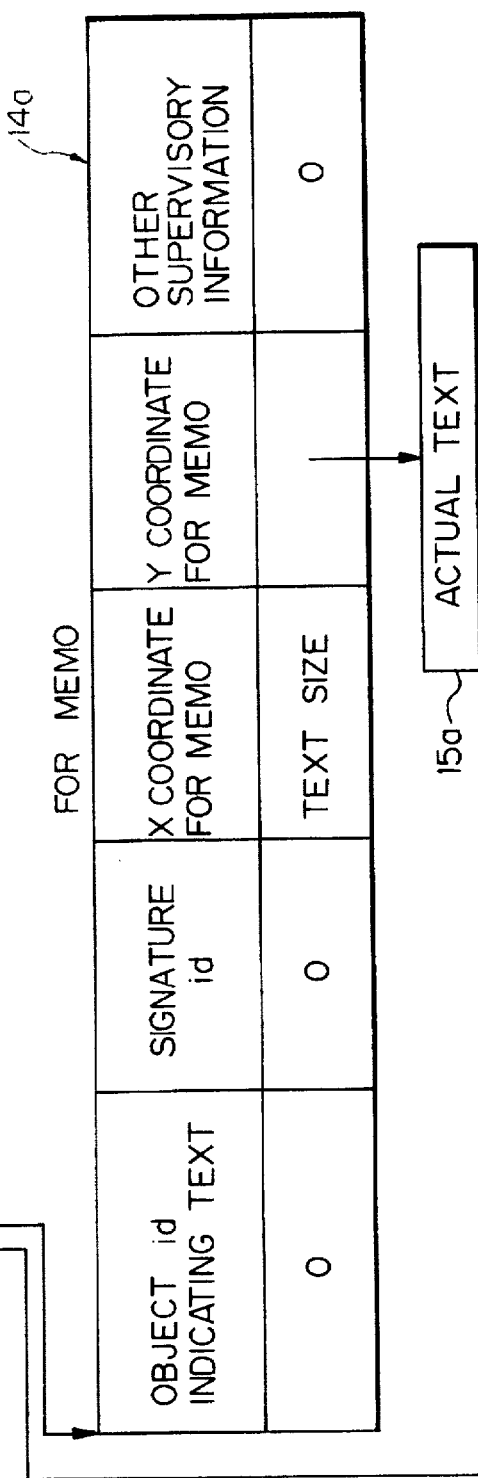
| OBJECT id INDICATING TEXT | SIGNATURE id | X COORDINATE FOR MEMO | Y COORDINATE FOR MEMO | OTHER SUPERVISORY INFORMATION |
|---|---|---|---|---|
| | | TEXT SIZE | | |
| 0 | 0 | | | 0 |
ACTUAL TEXT

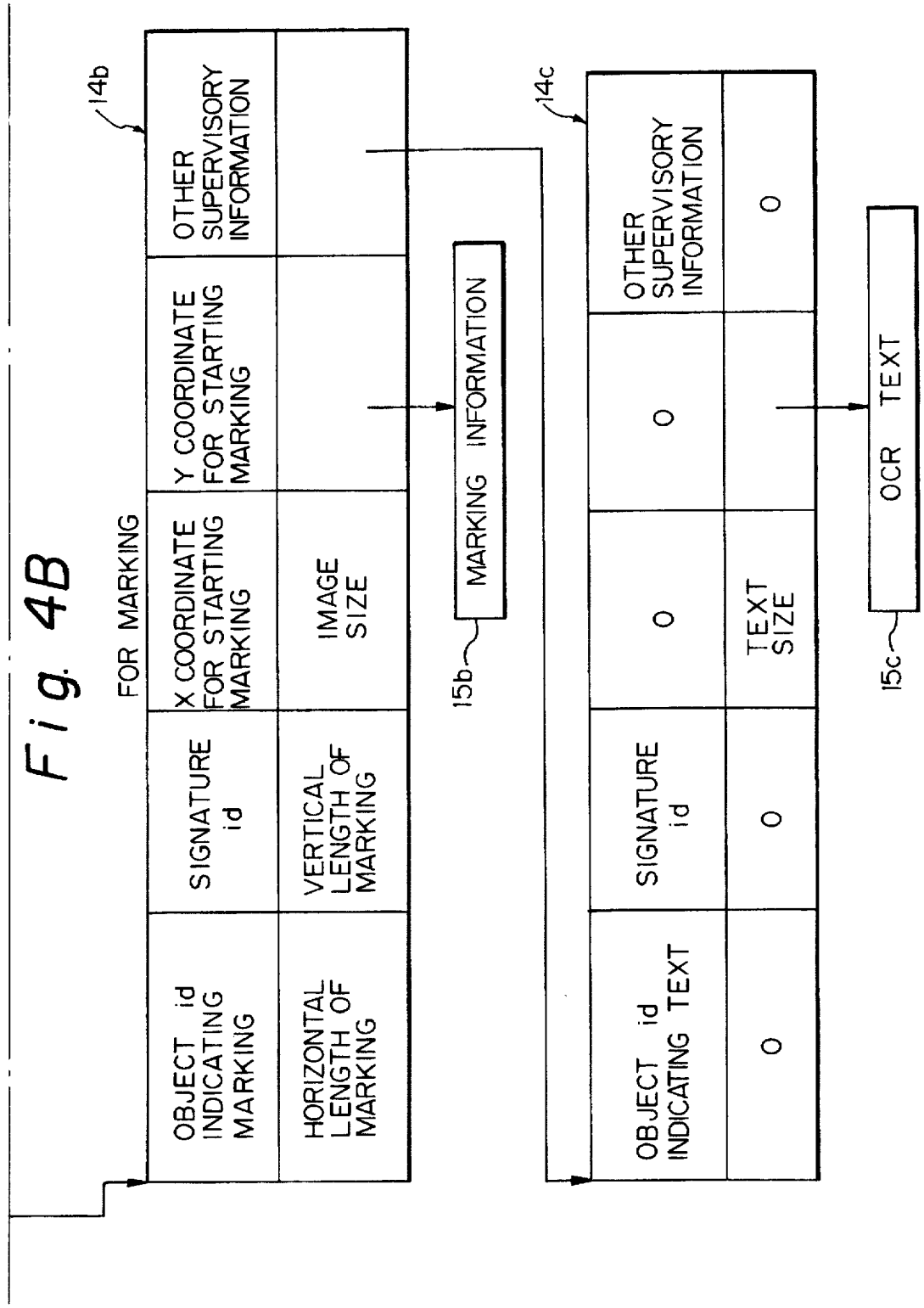

FILING DEVICE

BACKGROUND OF THE INVENTION

The present invention relates to a filing device for storing a plurality of documents in a storage in the form of images and allowing any of them to be searched for when needed.

Assume that a plurality of documents are filed without using a filing device. Then, it often occurs that a person taken out desired one of the documents for reference hits upon a new idea and desires to write a memo in the margin of a page of interest. In such a case, it has been customary with a filing device to once escape from a search mode, enter an image edit mode, and then modify an image. However, the problem with the conventional filing device is that the original document image itself must be modified and cannot be preserved unless it is newly registered as an independent image. Moreover, when a plurality of persons each modifies the document image in a particular manner, a great number of modified images are needed. This is not desirable from the efficiency standpoint.

When a person desires to mark an important part of a document image, the conventional filing device enters the image edit mode and allows a marking to be input. However, when a plurality of persons enter markings into a single document image, the problem discussed above in relation to a memo is also brought about. Further, it is impossible with the conventional filing device to reference only the marked part of a document image. Selecting only the marked part of a document image and referencing it is useful since the marked part is usually important and allows a person to see the entire context without scanning the entire page or entire document.

Today, various approaches are available with a filing device to search documents. For searching documents, it is necessary to input information in various forms in a filing device while relating them to the documents. However, it is not practicable with a conventional filing device to use the content of a memo or that of a marking as a key.

Japanese Patent Laid-Open Publication No. 1-169625 teaches an implementation for combining a memo or a marking with a searched image and displaying the resulting composite image. The implementation, however, simply provides a filing device with a function of overlaying a memo or a marking on a searched image. Specifically, it cannot implement a search using the content of a memo or that of a marking, identify a person entered a memo or a marking, display only a marked area of a filed document, or overlay the content of a memo in the margin of an original image.

SUMMARY OF THE INVENTION

It is, therefore, an object of the present invention to provide a filing device which allows a person to add a memo to a filed document image without updating it, while distinguishing the person from the others.

It is another object of the present invention to provide a filing device which allows a person to search document images by using the content of a memo as a key.

It is still another object of the present invention to provide a filing device which allows a person to mark a filed document image without updating it while distinguishing the person from the others, and can output only the marked area of the document image.

It is a further object of the present invention to provide a filing device which allows a person to search documents by using the content of a marking as a key.

In accordance with the present invention, a filing device has a document image storing section for storing document images, a searching section for searching for a particular document image in the document image storing section, a memo data generating section for generating data of a memo matching one of the document images stored in the document image storing section, the data containing information representing a person who wrote the memo, and an outputting section for outputting, based on the data generated by the memo data generating section, an image of the one document image while overlaying an image of the memo on the one document image.

Also, in accordance with the present invention, a filing device has a document image storing section for storing document images, a searching section for searching for a particular document image in the document image storing section, a marking data generating section for generating data of a marking matched to one of the document images stored in the document image storing section, the data containing information representing a person entered a marking, and an outputting section for outputting a marked document image on the basis of the data generated by the marking data generating section.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing a filing device embodying the present invention;

FIG. 2 which includes FIGS. 2A and 2B shows a data architecture particular to the embodiment;

FIG. 4 which includes FIGS. 4A and 4B shows specific contents of the object header of FIG. 3 for each of a memo and a marking;

DESCRIPTION OF THE PREFERRED EMBODIMENT

Referring to FIG. 1 of the drawings, a filing device embodying the present invention is shown As shown, the device has a computer 1 including an operating system A, a filing controller B, and a device driver C. A memory M, a scanner D1, a hard disk (magnetooptical (MO) disk) D2, a printer D3, a display D4, a mouse (not shown) and a keyboard (not shown) are connected to the computer 1. The operating system A includes a window system.

The filing controller B has an image input section B01 for inputting an image via a scanner D1. A print section B02 causes a printer D3 to print an image on a recording medium. An image read/write section B03 selectively reads or writes an image out of or in the hard disk D2. An image display section B1 displays an image on the display D4. An image edit section B2 edits an image. An image search section B3 searches images and is connected to the image input section B01, print section B02, and image read/write section B03. A text edit section B4 controls the writing of a memo. A code-to-image convert section B5 converts the text code of a memo to an image. An OCR (Optical Character Recognition) section B6 transforms a marked text image to a text. An image overlay section B7 overlays the image of a memo on an original image. An outline font supervise section B8 supervises outline fonts. A signature supervise section B9 supervises the signatures of persons who entered memo or marked images. A memo and marking supervise section B11 produces and manages memo data or marking data containing the signatures of persons entered memo or marked images.

The image input section B01, print section B02, image read/write section B03, image edit section B2, text edit section B4, code-to-image convert section B5, OCR section B6 and image overlay section B7 can access the memory M individually The outline font supervise section B8 is connected the code-to-image convert section B5. The signature supervise section B9 is connected to the code-to-image convert section B5, OCR section B6, and image overlay section B7. The memo and marking supervise section B6 is connected to the text edit section B4, code-to-image convert section B5, OCR section B6, and image overlay section B7. The present invention particularly pertains to, among the blocks shown in FIG. 1, the blocks enclosed by a phantom line.

Figure 2B:
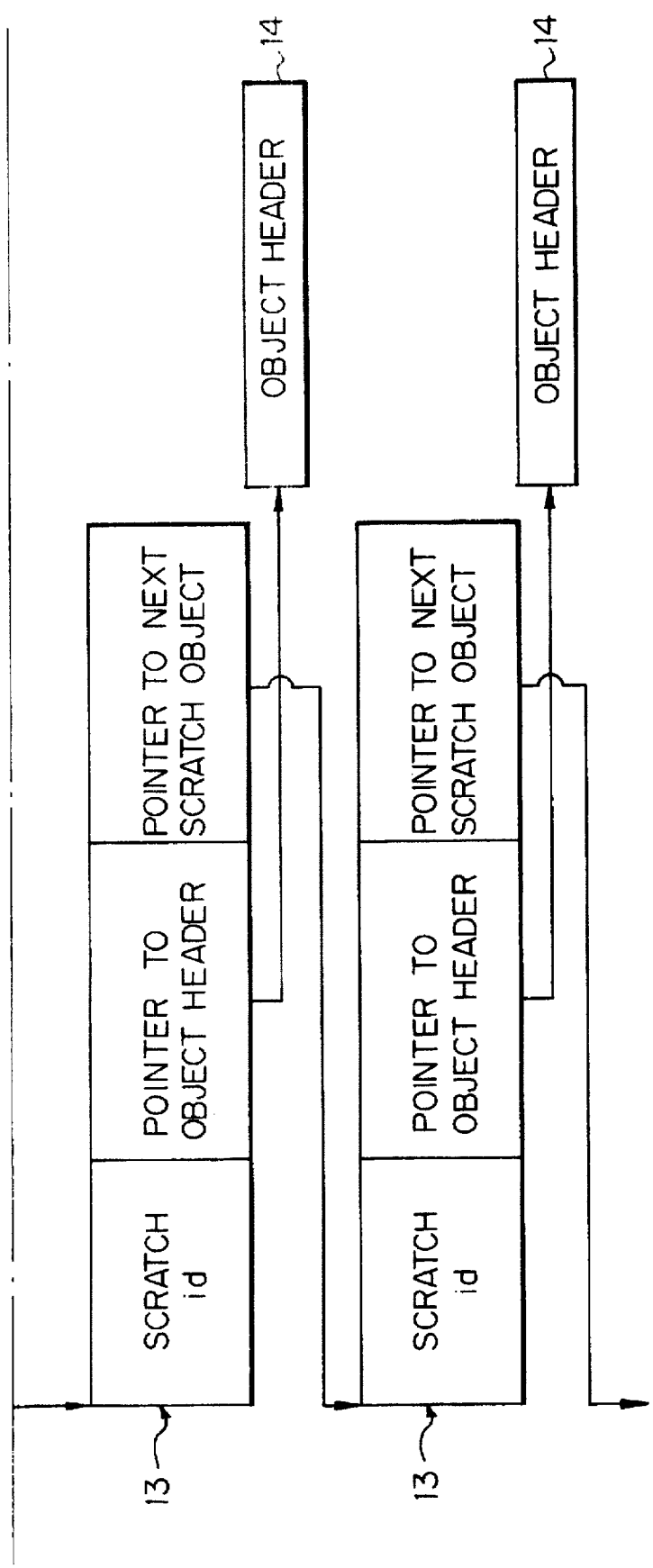

FIG. 2 shows a data architecture particular to the illustrative embodiment. Generally, a single document consists of a plurality of pages, and each page possibly contains a plurality of markings and a plurality of memos. In light of this, the embodiment manages data with the following scheme.

First, a document is supervised by a document object header 11. The document object header 11 is made up of a document id (identifier) field for distinguishing the document from the other documents, a pointer to first page field, and a field storing other information. The pages of the document are each supervised by a page object header 12 having a page id field, a pointer to next page field, a pointer to scratch object field, and a field storing other information.

Two kinds of scratch objects, i.e., memo scratch objects and marking scratch objects are linked to the page object header 12 by the pointer to scratch object. A scratch object 13 has a scratch id field, a pointer to object header field, and a pointer to next scratch object field. The scratch object 13 is linked to an object header 14 by the pointer to object header.

Figure 3:
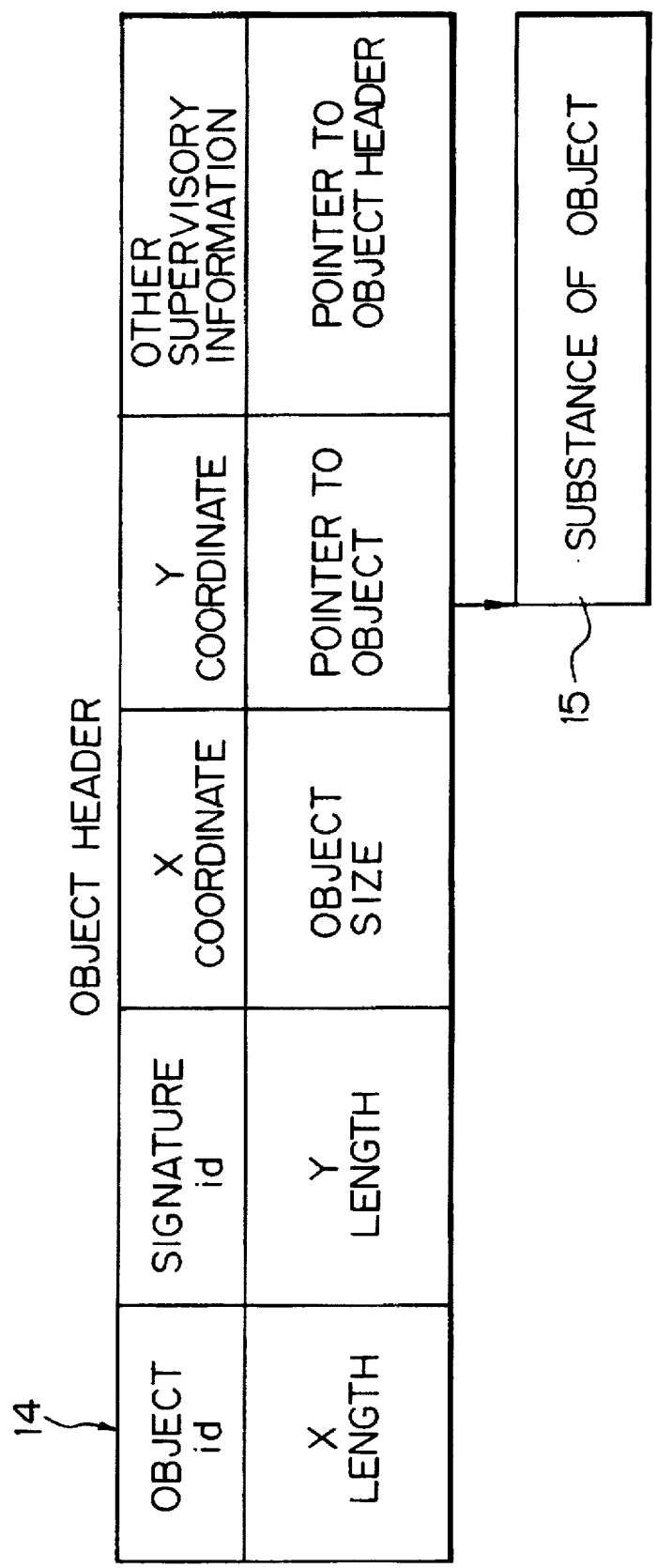
FIG. 3 shows a format of an object header included in the architecture of FIG. 2.

FIG. 3 shows the format of the object header 14. As shown, the object header 14 has an object id field, a signature id field, an X coordinate field, a Y coordinate field, a field assigned to other supervisory information, an X length field, a Y length field, an object size field, a pointer to object field, and a pointer to object header field. The object header 14 is linked to the substance 15 of an object by the pointer to object. Objects are generally classified into code texts and images. The object id is either an object id indicating a text or an object id indicating a marking.

FIG. 4 shows specific contents of the object header 14 for each of the entry of a memo and that of a marking. Assume that an image 16 is filed in the filing device. The object header 14 is linked to the image 16 by the document object header 11, page object header 12 and scratch object header 13, as shown in FIG. 2. In an object header 14a assigned to a memo, the object id indicates a text, the X and Y coordinates respectively indicate the X and Y coordinates where the memo should be entered, the object size indicates the size of the text, and the substance 15 of an object linked by the pointer to object is an actual memo or text 15a. The X and Y lengths and the pointer to object header are null ("0" in the figure).

In an object header 14b assigned to a marking,. the object id indicates a marking, the X and Y coordinates respectively indicate the X and Y coordinates where the marking begins, the X and Y lengths respectively indicate the horizontal and vertical dimensions of the marking, the object size indicates the size of the image, and the substance 15 of an object is marking information 15b.

Further, in an object header 14c linked by the pointer to an object header, the object id indicates a text, the object size indicates the size of a text, the substance 15 of an object linked by the pointer to object is a text 15c recognized by OCR. In the object header 14c, the fields assigned to the X and Y coordinates, X and Y lengths and pointer to object header are null.

Figure 5:
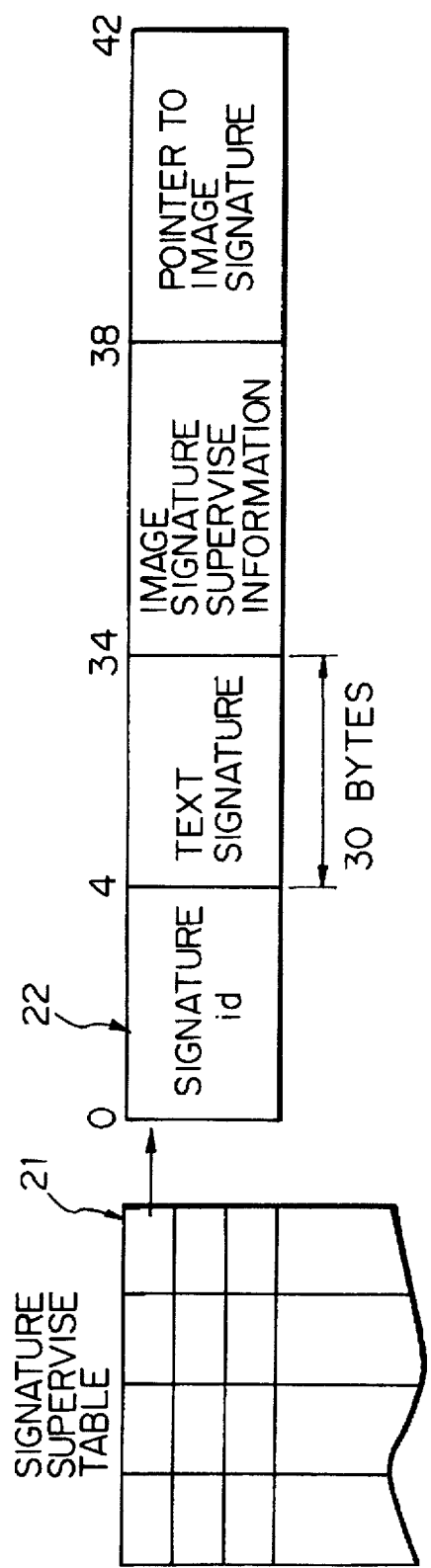
FIG. 5 shows a data architecture which a signature supervise section included in the embodiment uses to supervise signatures.
Figure 6:
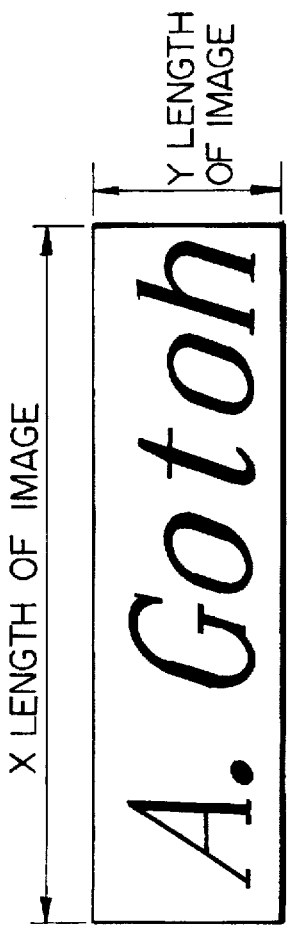
FIG. 6 shows a specific signature to be supervised on the basis of the data shown in FIG. 5.

FIG. 5 shows a data architecture which the signature supervise section B9, FIG. 1, uses to deal with signatures. As shown, the section B9 supervises signatures by use of a signature supervision table 21 made up of a plurality of entries 22. Each entry 22 has a signature id field, a text signature field, an image signature supervisory information field, and a pointer to image signature field. In the figure, the numerals on the abscissa represent the numbers of bytes. The signature id field has four bytes and allows a signature id to be entered in a binary number. The text signature field allows a person's name to be entered in the form of a code in up to thirty bytes. The image signature supervisory information field is assigned to image information particular to an image representing a signature. A specific image representing a signature is shown in FIG. 6. The signature image information consist of the lengths of an image in the X and Y directions, the resolution of an image, and, in the case of a color signature, a color.

Figure 7:
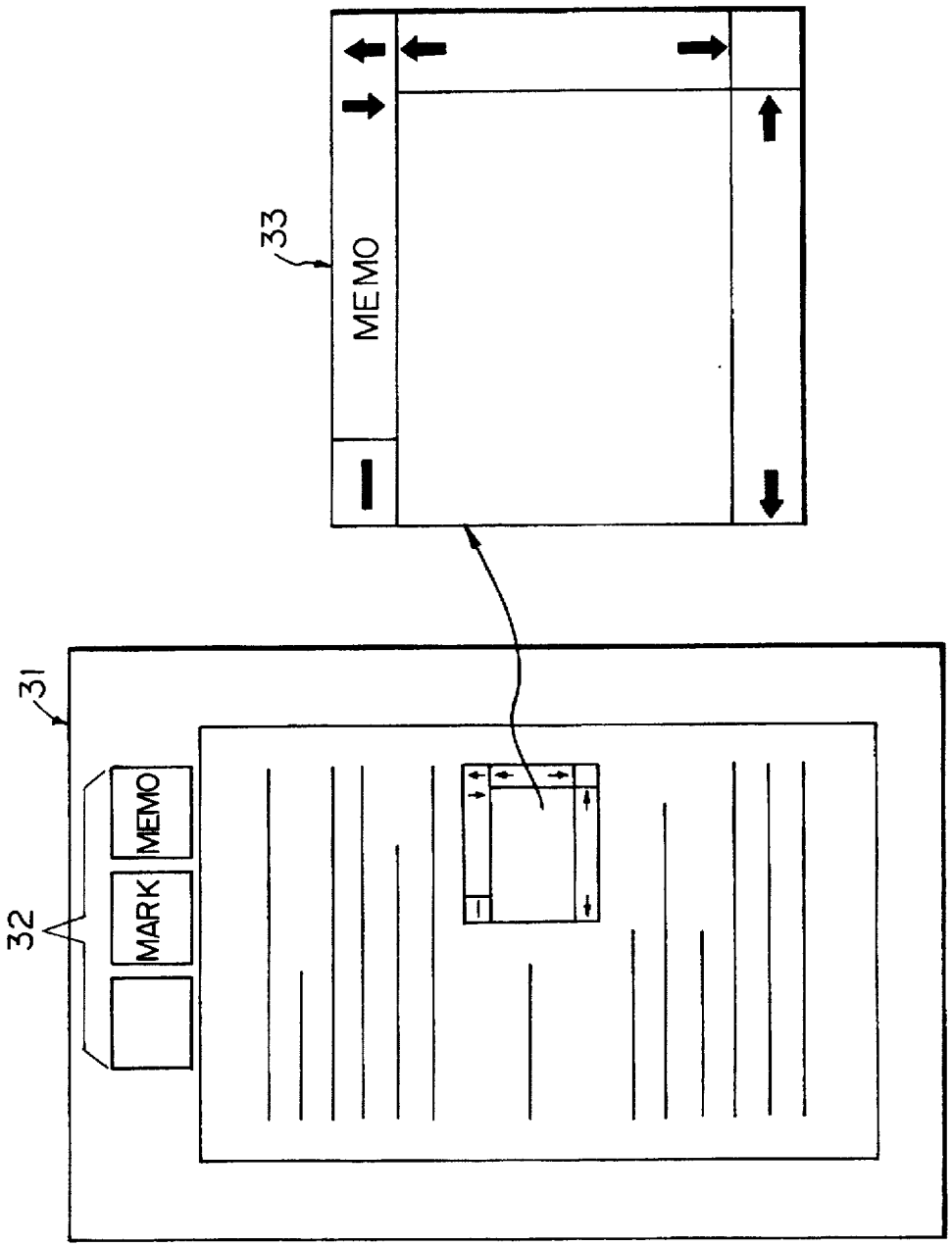
FIG. 7 shows a specific picture appearing on a display and available with the embodiment.

FIG. 7 shows screen 31 included in the display D4, FIG. 1. As shown, after a desired document has been searched for, a desired page of the document is displayed on the screen 31. A plurality of icons are also displayed on the screen 31. To write a memo in the page appearing on the screen 31, the operator clicks a Memo icon on the screen 30 with the mouse. Then, a window 33 appears on the screen 31 and urges the operator to enter a text. After the text has been fully entered, data shown in FIGS. 2 and 4 are generated. On the other hand, when the operator clicks a Marking icon in order to mark a desired area of the page, the apparatus enters a mark mode. When the operator marks the desired part on the screen 31 with the mouse, the apparatus reacts in such a manner as to show the operator that the desired part has been marked. As a result, data shown in FIGS. 2 and 4 are generated.

The operation of the filing device will be described hereinafter specifically.

Figure 8:
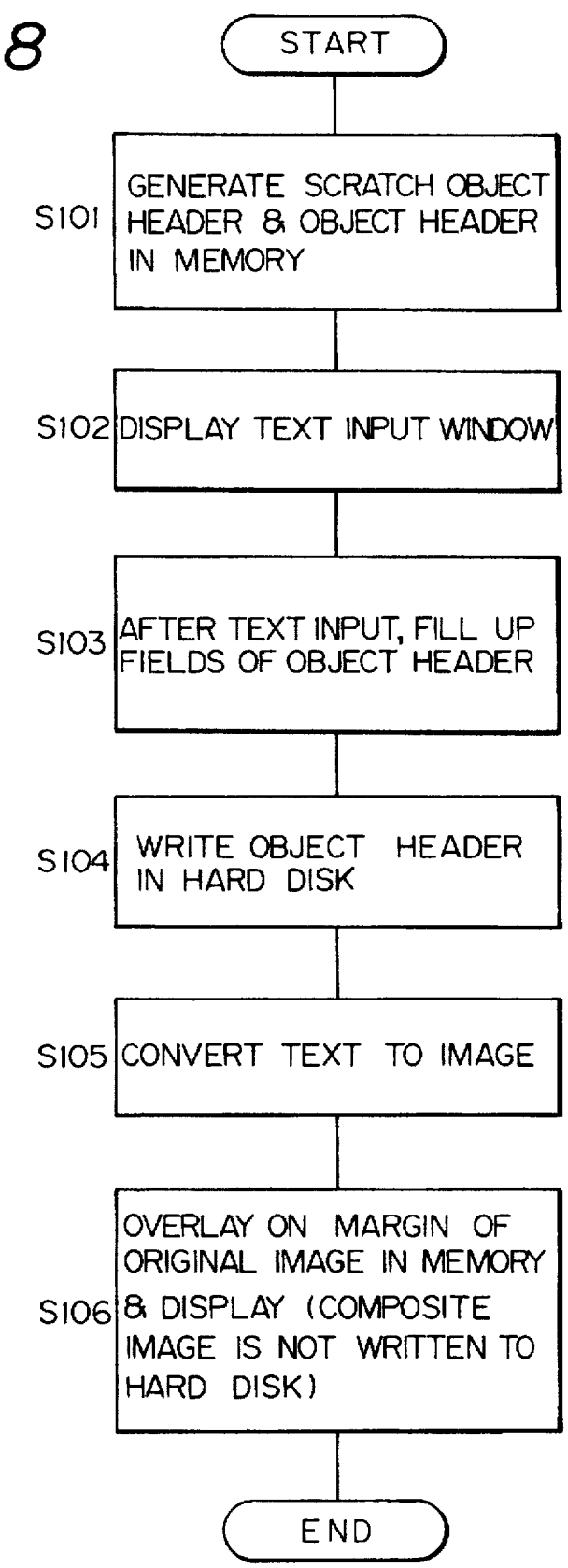
FIGS. 8 and 9 are flowcharts respectively demonstrating a memo writing procedure and a marking procedure to be executed by the embodiment.

To begin with, a reference will be made to FIG. 8 for describing a procedure for entering a memo. The hard disk D2, FIG. 1, stores a plurality of document images entered via the scanner D1 and image input section B01. A desired document image read out of the hard disk D2 by the image search section B3 appears on the display D4 in the manner shown in FIG. 7. When the operator clicks the Memo icon with the mouse, the procedure shown in FIG. 8 begins. First, the memo and marking supervise section B11 forms the scratch object and object header 14 shown in FIG. 2 in the memory M (step S101). Subsequently, the window 33 appears on the screen 31, FIG. 7, to allow the operator to enter a text (step S102). As the operator enters a text on the keyboard, the text edit section B4 sequentially writes the text or memo in the window 33. After the text has been entered, the memo and marking supervise section B11 fills up the various fields of the object header 14 (step S103). The object header 14 is written to the hard disk D2 (step S104). If the operator enters a signature in addition to the text, the signature supervise section B9 supervises it.

The code-to-image convert section B5 and outline font supervise section B8 transform the input text to an image (step S105). Then, the image overlay section B7 combines the resulting image with the original image. The composite image appears on the display D4. This is the end of the memo entering procedure. It should be noted that the composite image appearing on the display D4 is not written to the hard disk D2.

Figure 9:
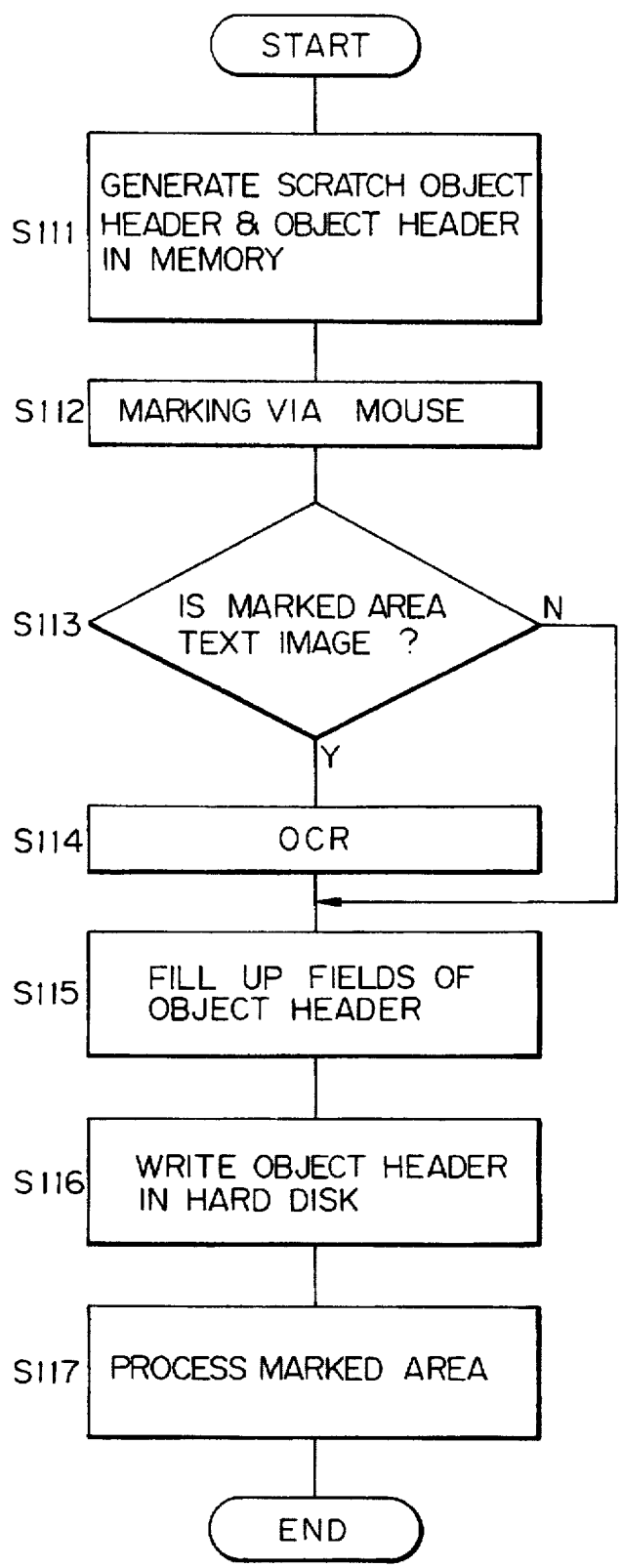

Referring to FIG. 9, a procedure for marking a desired image will be described. This procedure begins when the operator clicks the Marking icon on the screen 31 shown in FIG. 7. First, the memo and marking supervise section B11 forms the scratch object 13 and object header 14 shown in FIG. 2 in the memory M (step S111). As the operator marks a desired area of the image on the screen 31 (step S112), the memo and marking supervise section B11 determines whether or not the marked area is a text image (step S113). If the marked area is a text image (Y, step S113), the OCR section 6 recognizes the marked area (step S114) so as to convert it to a text. Subsequently, the memo and marking supervise section B11 fills up the various fields of the object header 14 (step S115). The text produced by OCR is pointed from the object header 14c, as shown in FIG. 4. On the other hand, if the marked area is not a text image (N, step S113), the memo and marking supervise section B11 fills up the fields of the object header 14 without the intermediary of OCR (step S115). Thereafter, the object header 14 is written to the hard disk D2 (step S116). When a signature is entered in addition to the marking, the signature supervise section B9 deals with it. The marked area is reversed, enhanced, colored or otherwise processed, as desired. The resulting image is displayed on the display D4 by the display section B1 or printed by the printer D3 via the print section B02. Again, it should be noted that such image processing is not executed with the original image, but it is dealt with as the marking data 15b of FIG. 4 independently of the original image.

With the illustrative embodiment, it is also possible to display only the marked area of a document, as follows. Assume that the document id of the document object header 11, FIG. 2, has already been found by searching. The consecutive page id's are sequentially traced until a page id whose pointer to scratch object is not null has been found. Then, the object header 14 linked to the scratch object 13 is examined. As shown in FIGS. 3 and 4, the object header 14 is linked to the substance 15 of the actual object and, in addition, stores object information. Hence, the image display section B1 should only display an image on the display D4 in accordance with the object information of the object header 14. As a result, the marked area appears on the display D4 alone.

A procedure for searching the document by use of the content of a memo or that of a marking as a key, also practicable with the embodiment, is as follows. Assuming a key implemented by the content of a memo, the text 15a thereof is supervised by the object header 14a while the object header 14a is supervised by the scratch object 13. Hence, the content of the memo can be referenced in terms of code on the basis of the document id. In the case of a marking, if the marked area is a text image, it is recognized by OCR and managed in the form of code by the object header 14c, as stated earlier. Therefore, the content of the marking, like that of the memo, can be referenced in terms of code on the basis of the document id. This allows the document search section B3 to search for the content of the memo or that of the marking.

As stated above, the embodiment allows a memo to be entered into a filed document image. The memo is managed in the from of code information and can be used to search a document later. When a person desires to see a document image with a memo on the display D4, the code information of the memory is replaced with an outline font and then overlaid on the original image. At this instant, the font size is adjusted such that the memo is confined in the margin of the original image. This is also true with the printing of a document image.

Even when a plurality of persons enter memos into a single original image, the memo can be distinguished since their signatures are managed. In addition, a memo written by any designated person can be seen on the display D4. A person can confirm the content of a document by watching a marked area appearing on the display D4 alone. A content particular to the person can be seen since the contents of markings are supervised. Furthermore, since the contents of memo and those of marked areas are usable as a key, there can be realized diversified and accurate searching.

In summary, a filing device of the present invention causes memo data generating means to generate memo data related to a particular image document and containing information on the person entered the memo, overlays a memo image on the original document image on the basis of the memo data, and then outputs the resulting composite image. The device, therefore, allows a person to add a memo to a filed document without updating it, while distinguishing the person from the others. Searching means searches, based on the data generated by the memo data generating means, document images by use of the content of the memo as a key. Hence, document images can be searched on the basis of the content of a memo.

Further, marking data generating means generates marking data related to a particular image document and containing information on the person entered the marking, and outputs a marked document image on the basis of the data. Therefore, a person can mark a desired document image without updating it. Also, only a marked area can be output, and the person entered the marking can be identified. Moreover, the searching means searches, based on the data generated by the marking data generating means, documents by using the content of the marked area as a key. Hence, document images can be searched on the basis of the content of a marking.

Various modifications will become possible for those skilled in the art after receiving the teachings of the present disclosure without departing from the scope thereof.

What is claimed is:

1. A filing device comprising:

document image storing means for storing document images;

searching means for searching for a particular document image in said document image storing means;

memo data generating means for generating data of a memo corresponding to one of the document images stored in said document image storing means, said data containing information representing a person who wrote said memo; and outputting means for outputting, based on said data generated by said memo data generating means, an image of said one document image while overlaying an image of said memo on said one document image.

2. A filing device as claimed in claim 1, wherein said searching means searches the document images using a content of the memo as a key.

3. A filing device according to claim 1, wherein the memo data generating means comprises:

means for generating a document object header data structure including a reference to a page object header data structure; and means for generating the page object header data structure including a reference to the memo data.

4. A filing device according to claim 3, wherein the means for generating the page object header data structure comprises:

means for generating the page object header data structure to have a reference to an object header which includes a reference to the memo data.

5. A filing device comprising:

document image storing means for storing document images;

searching means for searching for a particular document image in said document image storing means;

marking data generating means for generating data of a marking corresponding to one of the document images stored in said document image storing means, said data containing information representing a person who entered a marking; and outputting means for outputting a marked document image using the data generated by said marking data generating means.

6. A filing device as claimed in claim 5, wherein said searching means searches the document images by using a content of the marking as a key.

7. A filing device according to claim 5, wherein the marking data generating means comprises:

means for generating a document object header data structure including a reference to a page object header data structure; and means for generating the page object header data structure including a reference to the marking data.

8. A filing device according to claim 7, wherein the means for generating the page object header data structure comprises:

means for generating the page object header data structure to have a reference to an object header which includes a reference to the marking data.

9. A method of processing a document, comprising the steps of:

generating a document;

storing the document in a file;

generating, by a person, information associated with a selected position in the document; and storing the information including an indication of the person who generated the information without making any changes to the document which has been stored in the file.

10. A method according to claim 9, further comprising the step of:

searching the information which has been stored.

11. A method according to claim 9, wherein the step of generating comprises: generating information which is text.

12. A method according to claim 9, wherein the step of generating comprises: generating information which is graphical.

13. A method according to claim 9, further comprising the step of:

analyzing the information which has been generated to identify the person who generated the information.

14. A method according to claim 9, wherein the storing step comprises the steps of:

creating a data structure including a field indicating the person who generated the information.

15. A method according to claim 14 further comprising the step of:

writing, in the data structure, a field indicating whether the information is textual or graphical.

16. A method according to claim 9, wherein the step of generating comprises:

generating a document object header data structure including a reference to a page object header data structure; and generating the page object header data structure including a reference to said information.

17. A method according to claim 16, wherein the step of generating the page object comprises:

generating the page object header data structure to have a reference to an object header which includes a reference to said information.

18. A method of processing a document, comprising the steps of:

generating a document;

storing the document in a file;

generating information associated with a selected position in the document; and storing the information separately from the document without updating the document.

19. A method according to claim 18, wherein the step of generating comprises:

generating a document object header data structure including a reference to a page object header data structure; and generating the page object header data structure including a reference to said information.

20. A method according to claim 19, wherein the step of generating the page object comprises:

generating the page object header data structure to have a reference to an object header which includes a reference to said information.

* * * * *